(12) United States Patent
Werner et al.

(10) Patent No.: US 9,812,680 B2
(45) Date of Patent: Nov. 7, 2017

(54) LOW Z-FOLD BATTERY SEAL

(75) Inventors: Christopher M. Werner, San Jose, CA (US); Tyson B. Manullang, Sunnyvale, CA (US); Gregory N. Stephens, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 902 days.

(21) Appl. No.: 13/599,377

(22) Filed: Aug. 30, 2012

(65) Prior Publication Data

US 2014/0065474 A1    Mar. 6, 2014

(51) Int. Cl.
- H01M 2/08 (2006.01)
- H01M 2/02 (2006.01)
- H01M 2/04 (2006.01)

(52) U.S. Cl.
CPC ............ *H01M 2/08* (2013.01); *H01M 2/021* (2013.01); *H01M 2/0207* (2013.01); *H01M 2/0267* (2013.01); *H01M 2/0292* (2013.01); *H01M 2/0408* (2013.01); *Y10T 156/1043* (2015.01)

(58) Field of Classification Search
CPC .. H01M 2/0207; H01M 2/021; H01M 2/0408; H01M 2/0292; H01M 2/0267; G09F 3/00
See application file for complete search history.

(56) References Cited

U.S. PATENT DOCUMENTS

| | | | |
|---|---|---|---|
| 2,798,895 A | 7/1957 | Nowotny | |
| 2,798,896 A | 7/1957 | Bly | |
| 4,152,825 A | 5/1979 | Bruneau | |
| 4,344,603 A | 8/1982 | Hozumi | |
| 4,455,026 A | 6/1984 | Pinkus | |
| 5,238,222 A | 8/1993 | Sumida | |
| 5,580,676 A | 12/1996 | Honda et al. | |
| 6,106,973 A | 8/2000 | Sonozaki et al. | |
| 6,174,164 B1 | 1/2001 | Masjedi | |
| 6,358,644 B1 | 3/2002 | Shibata et al. | |
| 6,368,744 B1 | 4/2002 | Hatazawa et al. | |
| 6,528,204 B1 | 3/2003 | Hikmet et al. | |
| 6,549,756 B1 | 4/2003 | Engstrom | |
| 6,790,178 B1 | 9/2004 | Mault et al. | |
| 6,924,551 B2 | 8/2005 | Rumer et al. | |
| 7,103,407 B2 | 9/2006 | Hjelt et al. | |
| 7,270,910 B2 | 9/2007 | Yahnker et al. | |
| 7,288,340 B2 | 10/2007 | Iwamoto | |

(Continued)

FOREIGN PATENT DOCUMENTS

| CN | 101702412 | 5/2010 |
|---|---|---|
| EP | 0792741 | 2/1986 |

(Continued)

*Primary Examiner* — Rena D Cronin
(74) *Attorney, Agent, or Firm* — Kilpatrick Townsend & Stockton LLP

(57) ABSTRACT

A portable electronic device comprises an electromechanical module having an actuator for positioning a mechanical element between first and second positions, and a controller coupled to the electromechanical module. The controller is configured to detect a mechanical event coupling to the electromechanical module, select an actuation signal to position the mechanical element in a safe position between the first and second positions, and transmit the selected signal, such that the mechanical element is positioned in the safe position during the event.

9 Claims, 7 Drawing Sheets

(56) References Cited

U.S. PATENT DOCUMENTS

| | | | |
|---|---|---|---|
| 7,356,923 B2 | 4/2008 | Honer | |
| 7,541,771 B1* | 6/2009 | Leavitt et al. | 320/112 |
| 7,622,895 B1 | 11/2009 | Griffin | |
| 7,663,064 B2 | 2/2010 | Dutta et al. | |
| 7,714,542 B2 | 5/2010 | Lee et al. | |
| 7,887,948 B2 | 2/2011 | Jang et al. | |
| 7,910,243 B2 | 3/2011 | Koh et al. | |
| 7,948,208 B2 | 5/2011 | Partovi et al. | |
| 7,952,322 B2 | 5/2011 | Partovi et al. | |
| 7,972,721 B2 | 7/2011 | Kozu et al. | |
| 7,976,981 B2 | 7/2011 | Lee | |
| 8,031,122 B2 | 10/2011 | Jang et al. | |
| 8,034,477 B2 | 10/2011 | Yamada | |
| 8,119,278 B2 | 2/2012 | Bailey et al. | |
| 8,124,269 B2 | 2/2012 | Takahashi et al. | |
| 8,169,185 B2 | 5/2012 | Partovi et al. | |
| 8,241,786 B2 | 8/2012 | Taniguchi et al. | |
| 8,259,013 B2 | 9/2012 | Jang et al. | |
| 8,260,371 B2 | 9/2012 | Kawata et al. | |
| 8,293,402 B2 | 10/2012 | Lee | |
| 8,345,420 B2 | 1/2013 | McClure et al. | |
| 8,427,825 B2 | 4/2013 | Szczypinski | |
| 8,445,125 B2 | 5/2013 | Baek et al. | |
| 8,526,998 B2 | 9/2013 | Koide et al. | |
| 8,558,509 B2 | 10/2013 | He et al. | |
| 8,603,670 B2 | 12/2013 | Taniguchi et al. | |
| 8,629,652 B2 | 1/2014 | Partovi et al. | |
| 8,629,654 B2 | 1/2014 | Partovi et al. | |
| 8,778,529 B2 | 7/2014 | Seo | |
| 8,890,470 B2 | 11/2014 | Partovi | |
| 8,896,264 B2 | 11/2014 | Partovi | |
| 8,901,881 B2 | 12/2014 | Partovi | |
| 8,942,409 B2 | 1/2015 | Kantor et al. | |
| 8,947,047 B2 | 2/2015 | Partovi et al. | |
| 8,999,566 B2 | 4/2015 | Chung et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,301,034 B2 | 3/2016 | Kantor et al. | |
| 2002/0094475 A1 | 7/2002 | Aoyama | |
| 2003/0129483 A1 | 7/2003 | Gross | |
| 2005/0142439 A1* | 6/2005 | Lee et al. | 429/163 |
| 2007/0154794 A1 | 7/2007 | Kim et al. | |
| 2007/0260136 A1 | 11/2007 | Hunter | |
| 2007/0264535 A1 | 11/2007 | Lee et al. | |
| 2008/0001573 A1 | 1/2008 | Carey | |
| 2008/0286644 A1* | 11/2008 | Yeo | 429/122 |
| 2009/0246620 A1 | 10/2009 | Lee et al. | |
| 2009/0317708 A1 | 12/2009 | Brandl et al. | |
| 2010/0052603 A1* | 3/2010 | Bourilkov et al. | 320/101 |
| 2010/0081049 A1 | 4/2010 | Holl et al. | |
| 2010/0316911 A1 | 12/2010 | Tesson et al. | |
| 2011/0014954 A1 | 1/2011 | Dossas et al. | |
| 2011/0043309 A1 | 2/2011 | Wamala et al. | |
| 2011/0050164 A1 | 3/2011 | Partovi et al. | |
| 2011/0076550 A1 | 3/2011 | Liang et al. | |
| 2011/0175569 A1 | 7/2011 | Austin | |
| 2011/0210954 A1 | 9/2011 | Murphy et al. | |
| 2011/0215480 A1 | 9/2011 | Gorczyca et al. | |
| 2011/0221385 A1 | 9/2011 | Partovi et al. | |
| 2011/0223447 A1* | 9/2011 | Ignor et al. | 429/7 |
| 2011/0236727 A1 | 9/2011 | Jang | |
| 2011/0287318 A1 | 11/2011 | Loveness et al. | |
| 2012/0116176 A1 | 5/2012 | Moravec et al. | |
| 2012/0121944 A1 | 5/2012 | Yamamoto et al. | |
| 2012/0305605 A1 | 12/2012 | Vassaux et al. | |
| 2013/0034763 A1 | 2/2013 | Byun | |
| 2013/0053110 A1 | 2/2013 | Pope et al. | |
| 2013/0071696 A1 | 3/2013 | Kim et al. | |
| 2013/0093388 A1 | 4/2013 | Partovi | |
| 2013/0099563 A1 | 4/2013 | Partovi et al. | |
| 2013/0171490 A1 | 7/2013 | Rothkopf et al. | |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2013/0323055 A1 | 12/2013 | Eden et al. | |
| 2014/0050948 A1 | 2/2014 | Hashimoto et al. | |
| 2014/0103873 A1 | 4/2014 | Partovi et al. | |
| 2014/0132210 A1 | 5/2014 | Partovi | |
| 2014/0147703 A1 | 5/2014 | Werner et al. | |
| 2014/0147730 A1 | 5/2014 | Werner | |
| 2014/0191568 A1 | 7/2014 | Partovi | |
| 2014/0306654 A1 | 10/2014 | Partovi | |
| 2015/0043156 A1 | 2/2015 | Jain et al. | |
| 2015/0130412 A1 | 5/2015 | Partovi | |
| 2015/0145475 A1 | 5/2015 | Partovi et al. | |
| 2015/0185055 A1 | 7/2015 | King | |
| 2015/0220109 A1 | 8/2015 | von Badinski et al. | |
| 2015/0255776 A1 | 9/2015 | Dabov | |
| 2015/0256007 A1 | 9/2015 | Zadesky et al. | |
| 2016/0064780 A1 | 3/2016 | Jarvis et al. | |
| 2016/0080614 A1 | 3/2016 | Hollinger et al. | |

FOREIGN PATENT DOCUMENTS

| | | | |
|---|---|---|---|
| EP | 1931010 | | 6/2008 |
| EP | 2540221 | | 1/2013 |
| EP | 2653053 | | 10/2013 |
| JP | 61032951 | | 2/1986 |
| JP | 63314770 | | 12/1988 |
| JP | 10012200 | | 1/1998 |
| JP | 2000058018 | | 2/2000 |
| JP | 2001118547 | | 4/2001 |
| JP | 2001-250515 A | † | 9/2001 |
| JP | 2001250515 A | * | 9/2001 |
| JP | 2001250516 | | 9/2001 |
| JP | 2001332752 | | 11/2001 |
| JP | 2005108750 | | 4/2005 |
| JP | 2005129260 | | 5/2005 |
| JP | 2005268138 | | 9/2005 |
| JP | 2007048725 | | 2/2007 |
| JP | 2007165200 | | 6/2007 |
| JP | 2010-21074 A | † | 1/2010 |
| JP | 2010021074 | | 1/2010 |
| KR | 10-2001-000776 A | † | 2/2001 |
| KR | 20010007769 | | 2/2005 |
| KR | 20090075396 | | 7/2009 |
| WO | WO00/41252 | | 7/2000 |
| WO | WO2008/023199 | | 2/2008 |
| WO | WO2011/000239 | | 1/2011 |
| WO | WO2011/095758 | | 8/2011 |

\* cited by examiner
† cited by third party

LOW Z-FOLD BATTERY SEAL

BACKGROUND

This disclosure relates generally to portable electronic devices, and specifically to battery powered mobile devices. In particular, the disclosure relates to sealing structures for the battery assembly, as related to overall battery size, energy density and form factor.

Batteries come in a range of different architectures and forms, including traditional rod-and-tube (dry cell) and flat plate (flooded cell) designs, and more advanced "jelly roll" configurations in which the anode and cathode layers are laid down on opposite sides of a flat sheet or flexible substrate, coated with a liquid or gel electrolyte, and rolled up for insertion into a cylindrical battery case, which is then sealed at either end. In flat battery designs, the anode and cathode structure may be folded inside a low-profile casing or pouch, which is sealed along one or more opposite sides. Where the seal or "tail" structure is folded over the top of the battery, as in typical existing designs, it may increase battery height or thickness. Alternatively, where battery thickness is constrained, a tail structure folded over the top of the battery reduces the available volume for energy storage.

Battery configurations for portable electronics and mobile devices require a range of design tradeoffs, including size, weight, power consumption, manufacturability, durability and thermal loading. Each of these factors impacts overall storage capacity and energy density, as defined by the amount of useful energy that can be delivered per unit volume or mass. The battery form factor (or package shape) is also an important design consideration, particularly for compact portable and mobile devices where space is at a premium. At the same time, effective sealing and insulating mechanism are also required, in order to provide high energy density and service life with improved durability leakage prevention.

SUMMARY

Exemplary embodiments of the present disclosure include.

DETAILED DESCRIPTION

Figure 1:
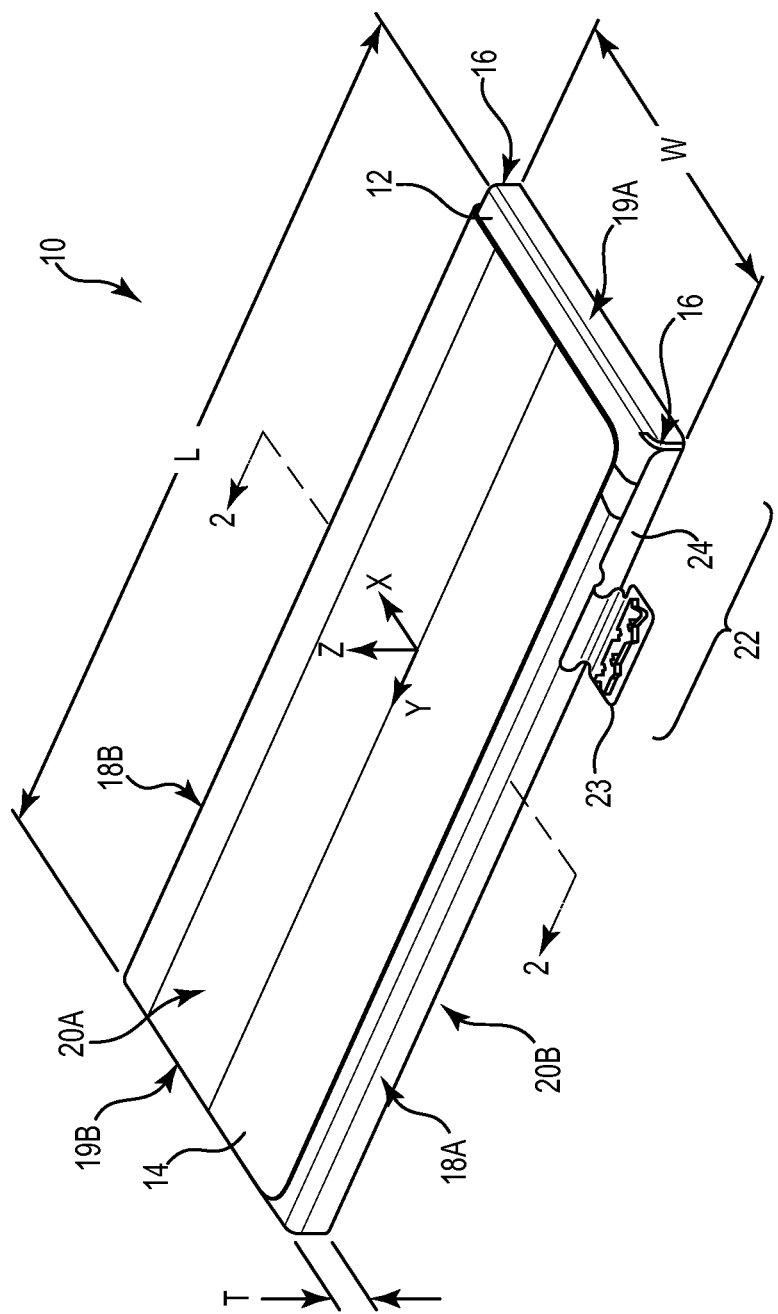
FIG. 1 is a perspective view of a battery assembly with reduced z-fold seal and protective wrap.

FIG. 1 is a perspective view of battery assembly 10 with casing 12 and protective wrap or film 14. Low z-fold seal structures 16 seal battery casing 12 to prevent leakage of electrolytes and other materials from the inside of battery assembly 10, to inhibit moisture intrusion, and to reduce oxidation and corrosion of the anode and cathode surfaces.

In the particular configuration of FIG. 1, battery assembly 10 has a substantially oblong or rectangular geometry or form factor, with width W defined between opposite sides 18A and 18B, and length L defined between opposite sides or ends 19A and 19B. Battery assembly 10 may also have a flat or substantially planar profile, with first and second major surfaces 20A and 20B separated by thickness T.

Length L, width W and thickness T define the form factor of battery assembly 10, as installed in an electronic device. Length L and width W are measured along first or second major surface 20A or 20B, in the direction of (horizontal) axes x and y, excluding the thickness of protective wrapper or film 14. Similarly, height or thickness T is measured between major surfaces 20A and 20B, along (vertical) axis z, also excluding protective wrapper 14.

In low-profile or flat configurations of battery assembly 10, thickness T is generally less than length L or width W, such that major surfaces 20A and 20B have substantially greater surface area than side and end surfaces 18A, 18B, 19A and 19B. Note, however, that the orientation of coordinate axes x, y, and z is arbitrary, and length L and width W may be interchanged, such that $L \geq W$ or $W \geq L$. The designation of sides 18A, 18B and ends 19A, 19B is also arbitrary, and they may be interchanged without loss of generality.

Depending on application, low z-fold seal structures 16 may thus be provided along opposite sides 18A and 18B of battery case 12, as shown in FIG. 1, or along opposite ends 19A and 19B. Alternatively, a single low z-fold seal 16 may be provided along a single side or end of battery assembly 10, for example first side 18A or first end 19A, with casing 12 formed as a continuous structure along the opposite corresponding surface, for example second side 18B or second end 19B.

Connector 22 provides electrical (power) connections to battery assembly 10, for example in a "pig tail" configuration with a connector board or manifold 23 coupled to battery assembly 10 via flex circuit 24, as shown in FIG. 1. Flex circuit 24 accommodates a range of battery connection configurations and allows connector board 23 to be relocated away from battery casing 12 during wrapping and unwrapping of protective film 14. Connector 22 also provides for a variety of different couplings to battery assembly 10, for example along a side surface (e.g., side 18A or 18B) or an end surface (e.g., end 19A or 19B) of batter casing 12, or at a corner interface (e.g., between side 18A and end 19A, as shown in FIG. 1).

Because low z-fold seal structures 16 are provided on the side surfaces of battery assembly 10 (e.g., sides 18A and 18B, or ends 19A and 19B), and do not extend onto or above major surfaces 20A and 20B, the z-dimension (thickness T) of battery assembly 10 is reduced, as compared to other designs, where the seal structure or "tail" is folded over the top of the battery. That is, where seal structure 16 is not folded over onto top surface 20A or bottom surface 20B of battery assembly 10, thickness T is less than in other designs, in which the seal structure extends over a portion of the top or bottom surface. Thus, the reduced z-fold configuration of FIG. 1 provides a smaller overall battery design, as adaptable to a range of battery powered devices in which battery size is at a premium, including, but not limited to, portable electronics and mobile devices.

Where the total battery thickness is constrained, moreover, "fold-over" seal designs may decrease the available height (z-dimension) on the inside of the battery. Where the lateral dimensions (e.g., x and y) are held head steady, or where the lateral area is otherwise constrained, this leads to reduced interior battery volume, with a commensurate decrease in battery capacity. The reduced z-fold seal design of FIG. 1, on the other hand, provides battery assembly 10 with a corresponding increase in the available interior battery volume, because the seal fold does not extend over the top or bottom of battery itself; that is, seal structure 16 does not extend over top surface 20A or bottom surface 20B of battery assembly 10, as described above.

In applications where the battery form factor (or volume envelope) is constrained, therefore, or where there is a fixed available volume (for example, in the interior of an electronic device, where space is constrained), the interior volume of battery assembly 10 may be increased in height, as compared to other designs, by the amount that the "old" tail stuck up above or below the top or bottom surface of the battery. This low z-fold seal configuration, as shown in FIG. 1 and as further described below, thus provides battery assembly 10 with an improved size envelope and higher potential energy density, based on an increase in the available interior height and volume, as compared to the exterior size envelope.

In applications with a fixed available height or thickness T, for example, low z-fold seals 16 increase the available interior volume of battery assembly 10, providing higher net energy density and a greater power/weight (or power/size) ratio, as compared to other seal configurations that increase battery height and reduce interior volume. This is particularly relevant in low-profile battery assemblies 10, where major surfaces 20A and 20B are substantially larger than side surfaces 18A, 18B, 19A and 19B, and where even modest increases or decreases in absolute thickness may correspond to substantially much higher relative changes in interior volume and available anode and cathode area, with commensurate impact on battery system performance.

Protective wrapper or film 14 is configured to cover and protect battery assembly 10 during shipping and storage, and to retain low z-fold seal structures 16 in a generally vertical orientation against side surfaces 18A and 18B; that is, substantially perpendicular to major surfaces 20A and 20B. Protective wrapper 14 is also configured to accommodate connector 22 during installation and removal, and to provide for barcode scanning and other functions during manufacture and assembly, as described below.

Figure 2:
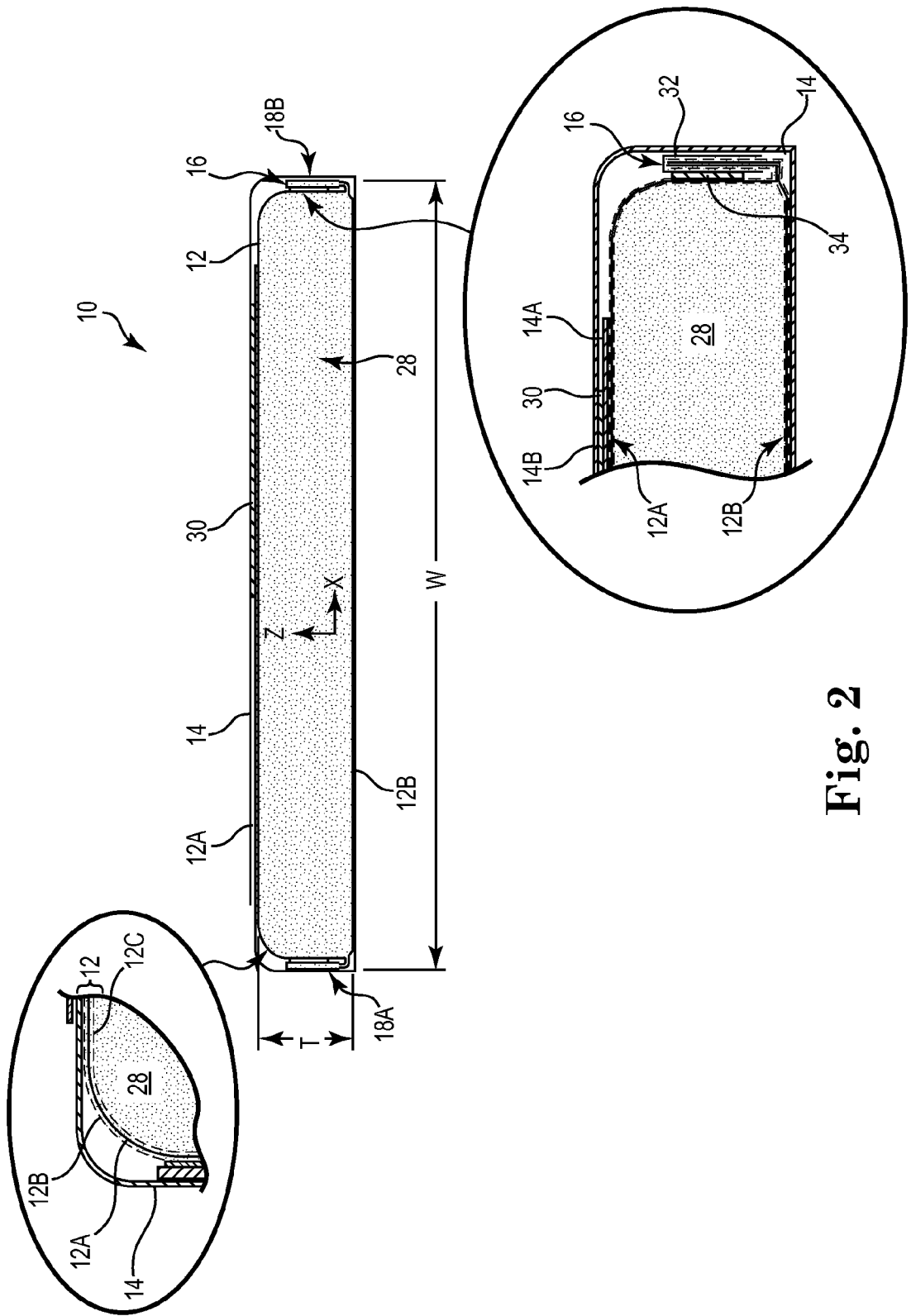
FIG. 2 is a cross-sectional view of the battery assembly.

FIG. 2 is a cross-sectional view of battery assembly 10, taken along line 2-2 of FIG. 1. First and second portions 12A and 12B of battery case 12 are formed about inner battery element 28, which stores electrical energy and provides power. Casing portions 12A and 12B define the major surfaces of battery 10, for example upper and lower surfaces 20A and 20B, as described above.

In rechargeable embodiments of battery 12, battery element 28 may typically have a jelly roll electrode structure, with a "wet" liquid or gel electrolyte interspersed between anode and cathode layers laid down on opposite surfaces of a rolled of folded plate structure, for example using intercalated lithium electrode material. Alternatively, a parallel plate (flooded electrode) structure may be used, for example with an acid electrolyte, or a post (or rod) configuration with a "dry" or paste (e.g., alkaline) electrolyte. Other types of batteries, including solid-state batteries, may be employed.

At least one low z-fold seal 16 is provided to seal casing portions 12A and 12B about inner battery element 28, for example along opposite sides 18A and 18B of battery assembly 10, as shown in FIG. 2. Alternatively, a single low z-fold seal 16 may be provided, for example by forming casing 12 as a flat sheet and bending the sheet around interior battery assembly 22, with low z-fold seal structure 16 on side 18B and with a substantially continuous casing 12 along opposite side 18A.

Battery casing 12 is typically formed of a laminated material, for example an aluminum or other metal core layer 12A (see inset) with plastic, polymer or other insulating layers 12B and 12C on the opposite (e.g., interior and exterior) surfaces of core layer 12A. Typically, core layer 12A provides strength, durability and additional structural features, while layers 12B and 12C provide electrical insulation and chemical protection from caustic or corrosive components of battery element 28, for example acid or alkali electrolytes.

Low z-fold seals 16 are formed in a laminar, folded configuration, for example by heat sealing or bonding top and bottom (laminated) battery casings 12A and 12B (dashed lines) together along first or second side 18A or 18B of battery assembly 10. Insulating layer or sheet 32 may be provided to cover the exposed edge of seal 16, for example using a polyimide insulator such as a KAPTON® sheet or film, as available from E. I. du Pont de Nemours and Company of Wilmington, Del.

The bonded, insulated (e.g., top and bottom) battery case portions 12A and 12B are then bent or folded upward along the end or side surface (e.g., side 18B) of battery assembly 10, in a substantially vertical orientation along the +z direction (that is, along the shortest dimension or thickness, T, of battery assembly 10). Alternatively, seal structure 16 may be formed by bonding case portions 12A and 12B along the top surface of battery assembly 10, and bending downward, in the −z direction.

Typically, polymer and similar insulating layers 12B and 12C may also provide a restoring bias to metal core layer 12A, so that low z-fold seal structures 16 tend to migrate from a substantially vertical or perpendicular orientation to a more horizontal or parallel orientation, as defined with respect to major surfaces 20A and 20B of battery assembly 10. This tendency is addressed by providing retention features to keep seal structures 16 in the substantially perpendicular orientation along the side of battery 10 during shipping and storage.

First, adhesive layer 34 may be provided to overcome the residual bias in battery case portions 12A and 12B, in order to bond seal structures 16 against sides 18A and 18B. Suitable materials for adhesive layer 34 include pressure sensitive adhesive (PSA) materials such as acrylics, rubber, acetate, nitrile and styrene compositions. Alternatively, other adhesive materials may be used, including, but not limited to, cyanoacrylate (CA) adhesives, epoxy resin adhesives, polymer cement materials, thermoplastics, urethane adhesives, and ultraviolet or heat-cured adhesive compounds.

Protective wrapper 14 may also be positioned about battery assembly 10 to protect during shipping, with overlapping layers 14A and 14B providing a compressive coupling to retain seal 16 in a substantially vertical orientation prior to installation. Alternatively, battery assembly 10 may be placed in a tray, shipping container or other device configured to provide a compressive coupling, as described below.

Protective wrapper 14 is typically formed of an insulating polymer such as a polyethylene terephthalate (PET) film, or another protective polymer wrap in sheet or film form. Low tack adhesive 30 may be provided to detachably retain wrapper 14 about battery casing 12, so that wrapper 14 provides a compressive coupling along opposite sides 18A and 18B of battery assembly 10. The compressive coupling prevents unfolding, and retains low z-fold seal structures 16 in a substantially perpendicular orientation with respect to first and second major surfaces 20A and 20B of battery 10.

For example, wrapper 14 may be provided in two (or more) overlapping layers 14A and 14B, with a low-tack adhesive 30 forming a detachable bond therebetween. Alternatively, low-tack adhesive 30 may be absent, and layers 14A and 14B of protective wrapper 14 may be coupled with via surface forces, or a static interaction, or using a mechanical retainer.

Figure 3:
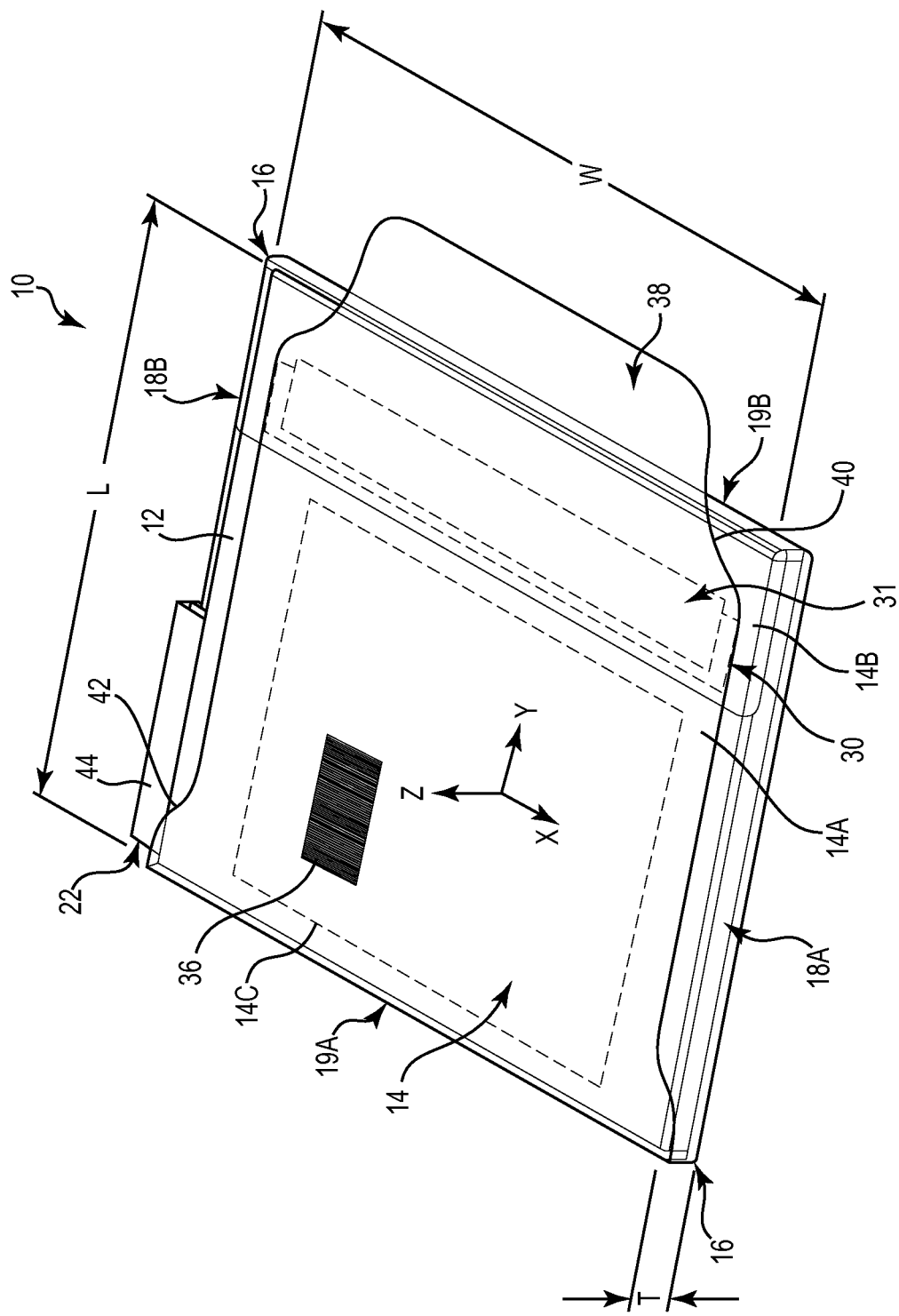
FIG. 3 is a perspective view of the battery assembly, with an alternate form factor.

FIG. 3 is a perspective view of battery assembly 10 with protective wrapper 14, in an alternate form factor embodiment. In this particular configuration, battery assembly 10 is approximately square, with length L substantially equal to or about the same as width W, for example within ten or twenty percent. Height or thickness T is substantially less than length L and width W, as described above (that is, T<<L and T<<W).

In the lengthwise wrapping configuration of FIG. 3, protective wrapper 14 provides a compressive coupling for low z-fold seals 16 along ends 19A and 19B of battery assembly 10. Protective wrapper 14 is sized with width W selected to cover most or substantially all of the top and bottom surfaces of battery assembly 10, leaving sides 18A and 18B free, so that battery case 12 is uncovered or exposed in these regions.

As shown in FIG. 3, protective wrapper 14 may also be substantially transparent, or may include a substantially clear, transparent or see-through portion 14C, in order to allow for barcode scanning and reading of other identifying indicia 36 on the outer surface (e.g., top or bottom surface) of battery assembly 10, when film 14 is wrapped about battery cover 12. Low tack adhesive 30 may also be provided in two or more separate layers 30 and 31, for example with film-battery layer 30 to removably bond first (inner) layer 14A of protective wrap or film 14 to cover 12 of battery assembly 10, and film-film layer 31 to removable bond first (inner) layer 14A and second (outer) layer 14B of protective film 14.

Low-tack adhesive layers 30 and 31 allow protective wrapper 14 to be attached to battery case 12 for shipping, as described above, providing compressive coupling to retain low x-fold seals 16 in a vertical orientation during shipping. Protective wrap or film 14 may also be wrapped about battery assembly 10 either in the lengthwise direction, as shown in FIG. 3, or in the widthwise direction, as described above with respect to FIGS. 1 and 2.

Where low-tack adhesive layers 30 and 31 are provided on either side of inner layer 14A, protective wrapper 14 may be substantially reversible, and positionable for wrapping with either surface facing battery cover 12. Alternatively, low-tack (battery-film) adhesive layer 131 may also be provided with substantially lower bonding strength than (film-film) adhesive layer 30, in order to prevent discoloration or marring the outer surface of battery casing 12. Battery-film adhesive layer 14D may also be absent, with a static or frictional coupling between protective wrapper 14 and the outer surface of battery casing 12.

Protective wrapper 14 is removable for installation, as described above, for example by pulling on tab 38 and unwrapping first and second layers 14A and 14B of protective wrapper 14 from battery cover 12. Pull tab 38 may include a reduced-width portion in outer layer 14A of protective wrapper 14, as defined by one or more tapers 40. Pull tab 38 may also be provided with color coding (e.g., red, yellow, blue, green, etc.), in order to provide a visual cue indicating the presence of protective wrapper 14, and the location of pull tab 38.

One or more additional cutouts or other edge features 42 may also be provided on first layer 14B of protective wrapper 14, adjacent battery cover 12, in order to accommodate the pigtail or other connector 22. Connector 22 may also be provided with connector cover 44 for additional protection during shipping, for example by attaching connector cover 44 to battery case 12 with protective wrapper 14, or as a separately detachable element.

Figures 4A, 4B:
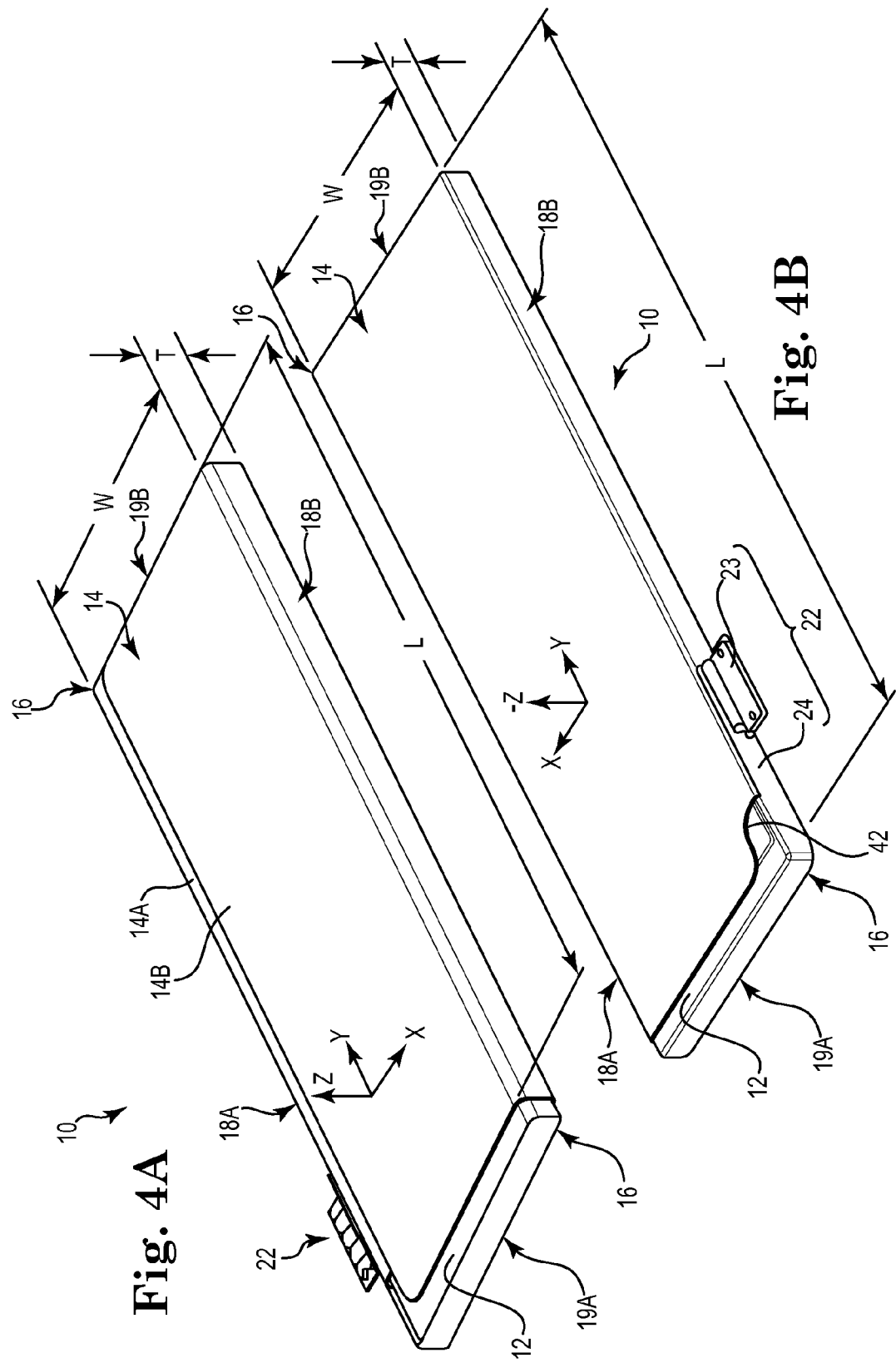
FIG. 4A is a top view of the battery assembly, in a width-wise wrapping configuration.
FIG. 4B is a bottom view of the width-wise wrapping configuration.

FIG. 4A is a top perspective view of battery assembly 10 with protective wrapper 14, in a width-wise wrapping configuration. In this configuration, protective wrapper 14 provides a compressive coupling to retain low z-fold seals 16 in a substantially vertical orientation along sides 18A and 18B of battery assembly 10. Protective wrapper 14 is sized with length L selected to cover portions of, or substantially all of, the top and bottom surfaces of battery assembly 10, along with first and second sides 18A and 18B. Ends 19A and 19B, however, may be free, with battery case 12 uncovered or exposed in these regions.

As shown in FIG. 4A, protective wrapper 14 may also be removed by pulling outer layer 14B directly away from inner layer 14A, and then unwrapping protective wrapper 14 from cover 12 of battery assembly 10. Thus, no separate tab feature is necessary, and outer later 14B may or may not be color coded, depending on application.

FIG. 4B is a bottom perspective view of battery assembly 10 as shown in FIG. 4A, illustrating cutout feature 42 for a pigtail or other connector 22. Cutout 42 is configured to space the edge of protective wrapper 14 from the connection point between connector 22 and battery assembly 10, for example where flex circuit 24 couples to the corner interface of second side 18B and first end 19A, as shown in FIG. 4B.

Cutout feature 42 thus prevents interference with connector 22 during installation and removal of protective wrapper 14. In particular, flex circuit 24 allows connector board 23 to be manipulated or positioned away from battery assembly 10 during installation of protective wrapper 14, and cutout 42 allows connector board 23 to be repositioned along side 18B of battery assembly 10 after installation of protective wrapper 14, without interference between the edge of protective wrapper 14 and flex circuit 24, or the other components of connector 22.

Cutout feature 42 may also be configured as a scallop, divot, groove, slot, channel or depression along a portion of length L of wrapper 14, with or without the particular corner structure of FIG. 4B. Thus, cutout 42 is not limited to a step configuration, where width W decreases from feature 42 in the vicinity of connector 22 to the end of wrapper 14, but also encompasses other designs. For example, cutout feature 42 may be formed only in a region of wrapper 14 that is adjacent to connector 22. Further, width W of wrapper 14 may decrease in the vicinity of connector 22 to form cutout 42, and then increase back to a nominal value or to a different value along the rest of length L or wrapper 14. The wrapping configuration may also be either lengthwise or widthwise with respect to battery assembly 10, as described above, and the designations of length L and width W can be reversed with respect the configuration of cutout feature 42, along either side or edge of wrapper 14, without loss of generality.

Figure 5:
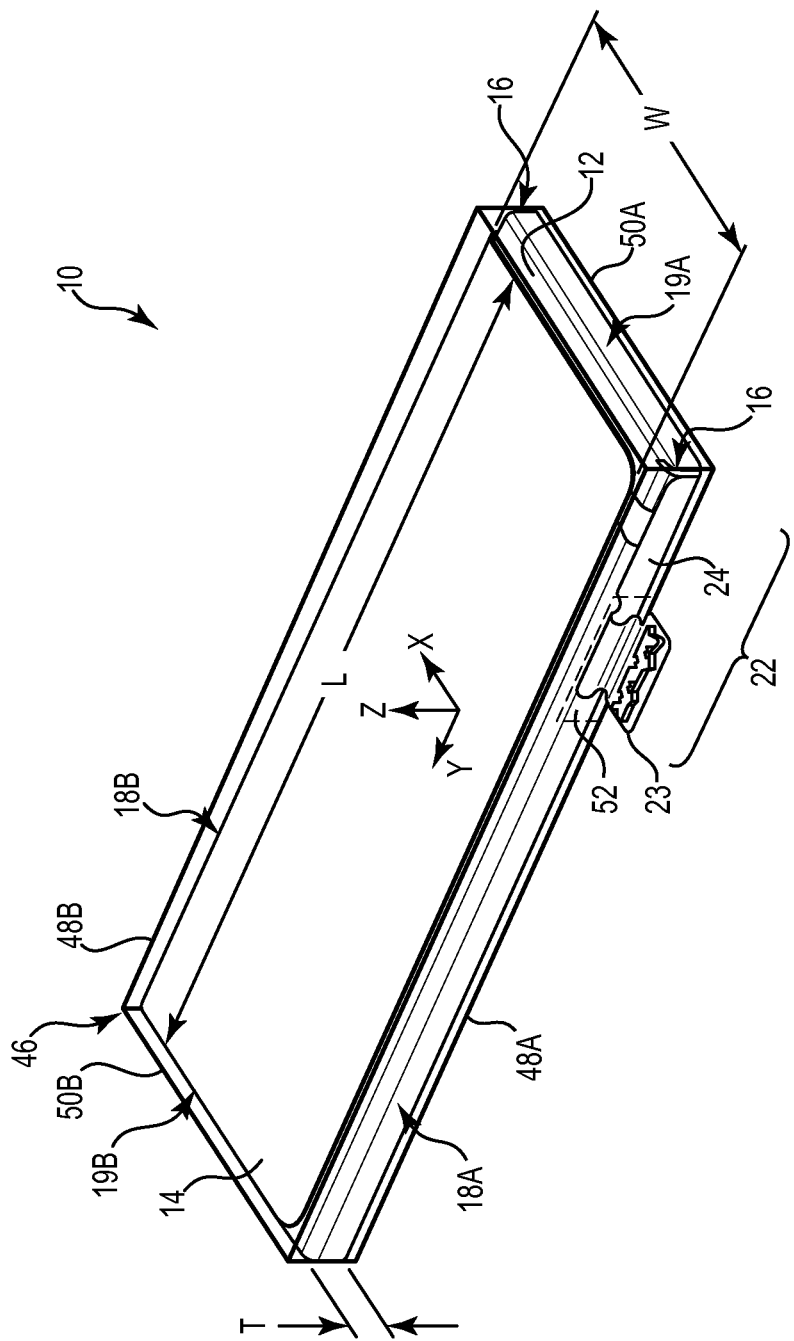
FIG. 5 is a perspective view of the battery assembly positioned in a storage tray or shipping unit.

FIG. 5 is a top perspective view of battery assembly 10, positioned in shipping or storage tray 46. Shipping tray 46 includes sides 48A, 48B and ends 50A, 50B having suitable tolerance with respect to length L and width W of corresponding sides 18A, 18B or ends 19A, 19B of battery casing 12, in order to generate compressive coupling to retain one or more low z-fold seals 16 in a substantially vertical or perpendicular orientation with respect to the major surfaces of battery 10. Unit 46 may also include a port, receptacle or similar feature 52 to accommodate connector 22, for example with flex circuit 24 extending within side 48A of shipping tray 46, and connector board 23 extending through side 48A at port feature 52.

Tray 46 may be used in combination with protective wrapper 14, in order to provide additional compressive retention for low z-fold seals 16 along one or more of sides 18A, 18B and ends 19A, 19B. Alternatively, battery assembly 10 may be placed in tray 46 without protective wrapper 14, with the compressive coupling provided by selecting suitable tolerances for sides 48A, 48B and ends 50A, 50B with respect to the corresponding surfaces of battery 10.

Figure 6:
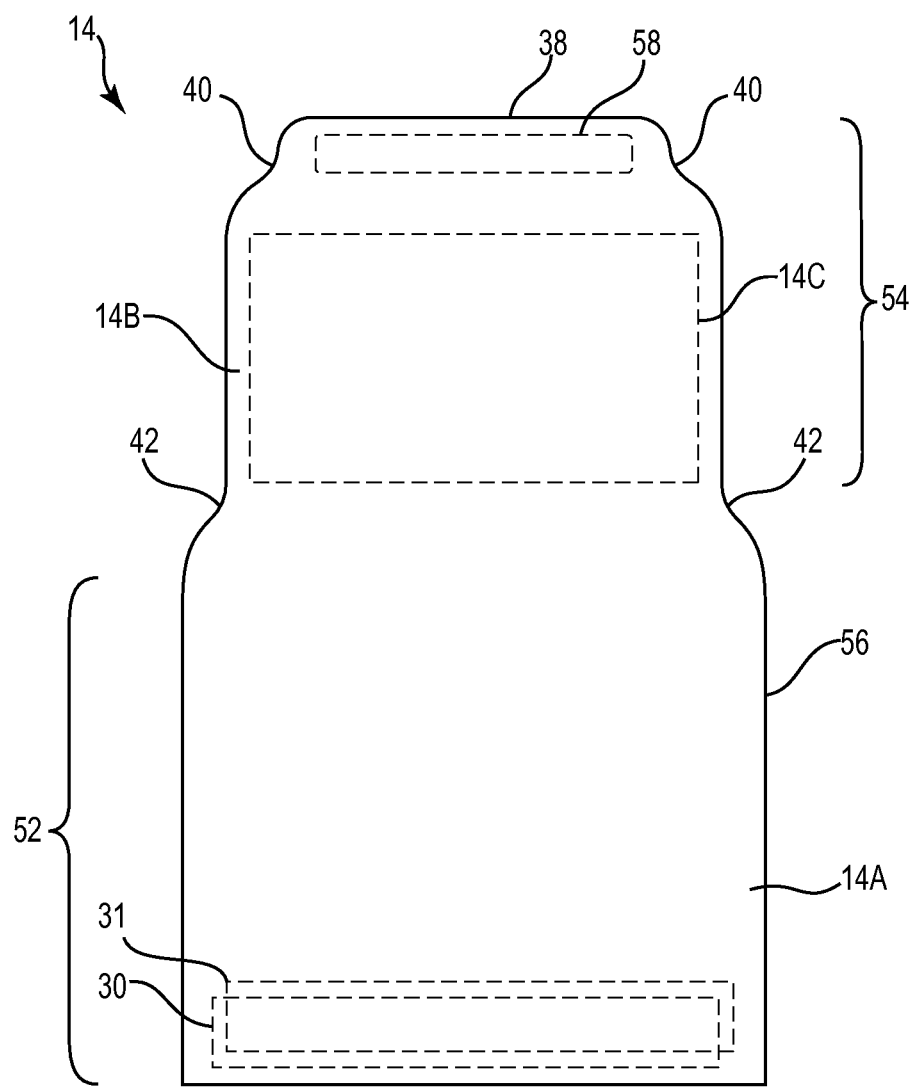
FIG. 6 is a plan view of a protective wrap for the battery assembly.

FIG. 6 is a plan view of protective film wrapper 14 for battery assembly 10. Wrapper 14 extends from first end 52 to second end 54, within a perimeter defined by outer edge 56. When wrapped about a battery, first end 52 of protective wrapper 14 typically forms first (inner) layer 14A, and second end 54 forms second (outer layer) 14B, as described above. The designations first and second, however, are merely arbitrary, and may be interchanged without loss of generality. In addition, protective wrapper 14 may be wrapped about the battery in either orientation or direction, depending on application.

One or more adhesive layers may be provided to detachably retain protective wrapper 14, for example film-film detachable adhesive layer 30 or film-battery detachable adhesive layer 31, or both. For example, low tack adhesive may be provided in one or more layers 30 and 31, for example film-battery or film-film layers on one or both sides of protective wrapper or film 14, in order to removably bond wrapper 14 to the battery assembly, or to removably bond different layers of wrapper 14 together, or to perform both functions. Alternatively, one or both of low tack adhesive layers 30 and 31 may be absent, or a different adhesive material may be used.

Transparent window 14C (dashed line; transparent or translucent material) may also be provided to view the surface of the battery casing, e.g., for bar code scanning or for reading an identifier or indicia, as described above. Alternatively, wrapper 14 may be transparent or translucent over substantially all or over a substantial majority of its surface area, for example over substantially all or most of the top or bottom surface of the battery assembly, or both. Wrapper 14 may also be substantially transparent over substantially all of its surface area except where color coding and other indicia are provided, for example colorcoding indicia 58 on tab portion 38. Indicia 58 may provide a color coding to indicate the presence or location of tab feature 38, or indicia 58 may provide other identifying information such as model, size, date or serial number, and indicia 58 be located anywhere on wrapper 14, for example at first or second end 52 or 54, or between ends 52 and 54.

One or more taper features 40 may be provided to define pull tab portion 38 of protective wrapper 14, for example in first end 54, as shown in FIG. 6. In addition, one or more tapers, ports, slots, cutouts or other edge features 42 may also be provided to space edge 56 of protective wrapper 14 from the battery connector, for example to avoid interference during installation and removal, as described above. Cutouts 42 may be provided, for example, between first end 52 and second end 54 of wrapper 14, as shown in FIG. 6, or in one or both of first end 52 and second end 54, depending on the battery size, connector location and wrapping configuration. One or more cutouts 42 may further provide a "step" feature of reduced width extending to first or second end 52 or 54 of wrapper 14, or a more localized region of reduced width between ends 52 and 54, for example adjacent the connector when film 14 is wrapped about a battery assembly, as described above.

Figure 7:
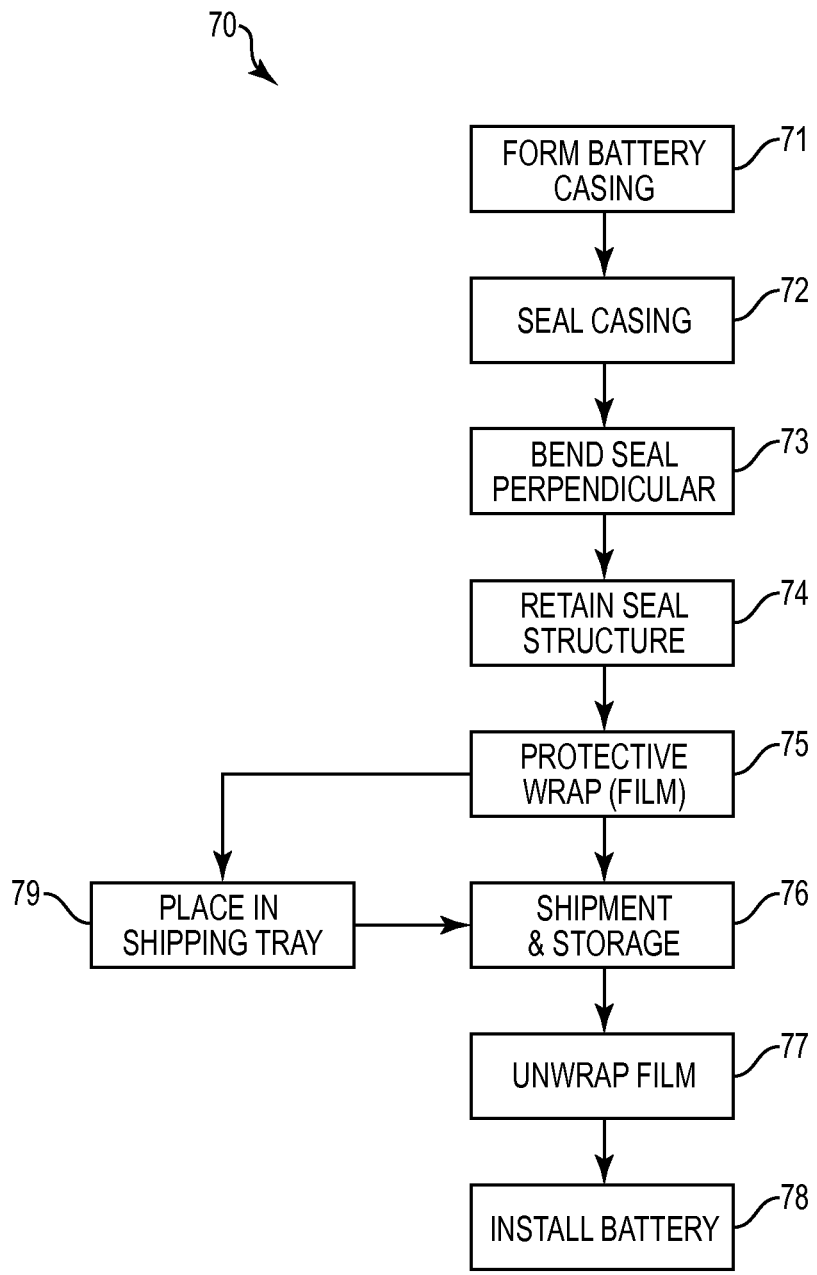
FIG. 7 is a block diagram of a method for retaining a low z-fold seal against the side of a battery assembly for storage and installation.

FIG. 7 is a block diagram of method 70 for retaining low z-fold seals against the side of a battery assembly. Method 70 comprises forming a battery case (step 71), bonding the battery case to form a seal (step 72), bending the seal into a substantially perpendicular orientation (step 73), and retaining the seal against the side of the battery (step 74).

Forming the battery case (step 71) comprises forming first and second portions of the case about a battery element. The first and second casing portions define first and second major surfaces of the battery, for example top and bottom surfaces. The sides of the battery extend between the first and second major surfaces.

Bonding the battery case (step 72) comprises bonding the first and second casing portions together along a selected side, in order to form a seal structure. The bonding may be performed, for example, by heat treatment or thermal bonding, or using an adhesive or mechanical attachment.

Bending the seal (step 73) comprises bending the seal into a substantially vertical or perpendicular orientation with respect to the first and second major surfaces of the battery. Thus, the seal structure is oriented substantially parallel to the selected side. The seal may also be provided with an insulating material such as a KAPTON® or polyimide sheet, in order to cover the exposed edge.

Retaining the seal (step 74) comprises retaining the seal structure in the substantially perpendicular orientation with respect to the selected side. Retention may be accomplished, for example, by use of a contact adhesive, glue, epoxy or other adhesive material to bond the seal structure to the selected side.

Method 70 may also include wrapping the battery casing with a protective film (step 75). The protective film forms a compressing coupling to retain the seal in the substantially perpendicular orientation along and against the selected side of the battery, so that the residual bias in the casing material is overcome, and the form factor of the battery is preserved.

Wrapping the battery casing may include positioning a cutout with respect to a connector on the battery, so that an edge of the protective film is spaced from the connector. The cutout is configured to avoid interference while repositioning the battery connector during installation and removal of the protective film.

Generally, the adhesive film remains in place for a substantial time during storage and shipment (step 76), allowing the adhesive to set sufficiently to overcome any residual bias in the battery casing. Thus, the seal structure is retained against the selected side of the battery even after unwrapping the protective film (step 77). As a result, the seal structure remains in the substantially perpendicular orientation during installation (step 78) and use, for example in a portable electronic device or mobile phone.

The battery assembly may also be placed in a shipping tray or storage unit (step 79). The storage unit maintains a tightly selected tolerance with respect to the battery casing, generating a compressive coupling to retain the seal structure against the selected side. The battery may be wrapped first, before placement into the shipping or storage tray, or the battery may be unwrapped, so that the storage unit provides the primary compressive coupling to retain the seal structure against the side of the battery while the adhesive sets.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A battery assembly comprising:
a battery element for storing electrical energy;
a battery case comprising first and second casing portions formed about the battery element, the first and second casing portions defining first and second major surfaces of the battery case;
a seal structure for sealing the battery case about the battery element, the seal structure comprising a bond between the first and second casing portions, the bond extending along a side of the battery case, the side extending between the first and second major surfaces;
a fold in the seal structure, wherein the fold positions the seal structure against the side of the battery case in a substantially perpendicular orientation with respect to the first and second major surfaces;
a protective wrap positioned about the battery case;
a first adhesive detachably coupling the protective wrap to the battery case and having a first bonding strength; and
a second adhesive detachably coupling a first portion of the protective wrap to a second portion of the protective wrap and having a second bonding strength greater than the first bonding strength.

2. The battery assembly of claim 1, further comprising a third adhesive provided along the side of the battery case, wherein the third adhesive retains the seal structure against the side of the battery case in the substantially perpendicular orientation with respect to the first and second major surfaces.

3. The battery assembly of claim 1 further comprising an insulating layer formed over an exposed end of the seal structure.

4. The battery assembly of claim 1, wherein the protective wrap provides a compressive coupling to retain the seal structure in the substantially perpendicular orientation along the side of the battery case.

5. The battery assembly of claim 1, further comprising a color-coded tab configured to detach the protective wrap by overcoming a bonding force of the first and second adhesives.

6. The battery assembly of claim 4, wherein the protective wrap comprises a cutout configured to space an edge of the protective wrap from a connector of the battery assembly.

7. The battery assembly of claim 4, wherein the protective wrap comprises a transparent portion to view an indicia on the battery case.

8. The battery assembly of claim 1, further comprising a second seal structure formed by a second bond between the first and second casing portions, the second bond extending along an opposite side of the battery case, wherein a second fold positions the second seal structure in the substantially perpendicular orientation along the opposite side.

9. A portable electronic device comprising the battery assembly of claim 1.

* * * * *